COLOR TELEVISION SYSTEM

Filed Oct. 28, 1954

INVENTORS
JAMES W. SCHWARTZ
& ROGER D. THOMPSON
BY
ATTORNEY

United States Patent Office 2,837,687

Patented June 3, 1958

2,837,687

COLOR TELEVISION SYSTEM

Roger D. Thompson and James W. Schwartz, Princeton, N. J., assignors to Radio Corporation of America, a corporation of Delaware Application October 28, 1954, Serial No. 465,344

9 Claims. (Cl. 315—10)

This invention relates to color television and more particularly to methods and arrangements for reproducing images in substantially their natural color.

It has been previously proposed to produce an image in color by causing a single beam of electrons to impinge repeatedly upon different color light producing elements positioned upon a target electrode. The beam of electrons being sequentially intensity modulated with different color signals, each of which is representative of one of the image component colors, in synchronization with the sequential excitation by the electron beam of the component color light producing elements. To properly reproduce an image in this manner it is necessary that there be color coincidence or synchronization between the intervals of modulation during which the electron beam is intensity modulated with a particular component color signal, and the intervals of excitation during which a particular component color light producing element on the target electrode is being excited.

It has been proposed to position certain signal generating elements on the target electrode which will cause a signal to be generated as the target electrode is scanned by an electron beam. Various arrangements are possible for the signal generating elements, as examples, they may be composed of a secondary emissive material, a photo emissive material, a conducting material or the signal generating elements may be void of electron responsive material with the remainder of the target electrode being responsive to electron beam energy. Due to the fact that the target generated signal from the signal generating elements is indicative of beam position with respect to the target electrode, such a signal may be used to control the relationship between the intervals of modulation and the intervals of excitation. Because of the occurrence of possible rapid variations in this relationship there is a need for a system having rapid response to correct for such variations.

The present invention in its more general form contemplates in a color television system, of the type utilizing a target electrode composed of different component color light producing elements interlaid with signal generating elements, an apparatus for utilizing the target generated signals generated by electron beam energy exciting the signal generating elements, to assure color synchronism between the intervals of excitation and the intervals of modulation. The electron beam is held at substantially constant intensity as the beam is moved onto the signal generating elements. When the target signal from the signal generating elements reaches a certain level under these conditions, it is indicated that the electron beam has reached a particular deflection position. An electrical pulse having a characteristic indicative of the instantaneous beam position will be generated when the target signal reaches the certain level, and the pulse may be used to maintain color coincidence i. e., color synchronism between the intervals of excitation and the intervals of modulation or otherwise control the electron beam.

An object of this invention is to provide an improved color television image reproducing system.

Another object of this invention is to provide an improved electron beam controlling system to assure color synchronism between the intensity modulation of an electron beam and the color light producing elements excited on a target electrode.

Still another object of this invention is to provide a fast acting system for maintaining color synchronism between the intervals of modulation of an electron beam with different color signals, and the intervals of excitation by an electron beam of different color light producing elements.

Other and incidental objects of this invention will be apparent to those skilled in the art from reading the following specification and on inspection of the accompanying drawings in which.

Figure 1:
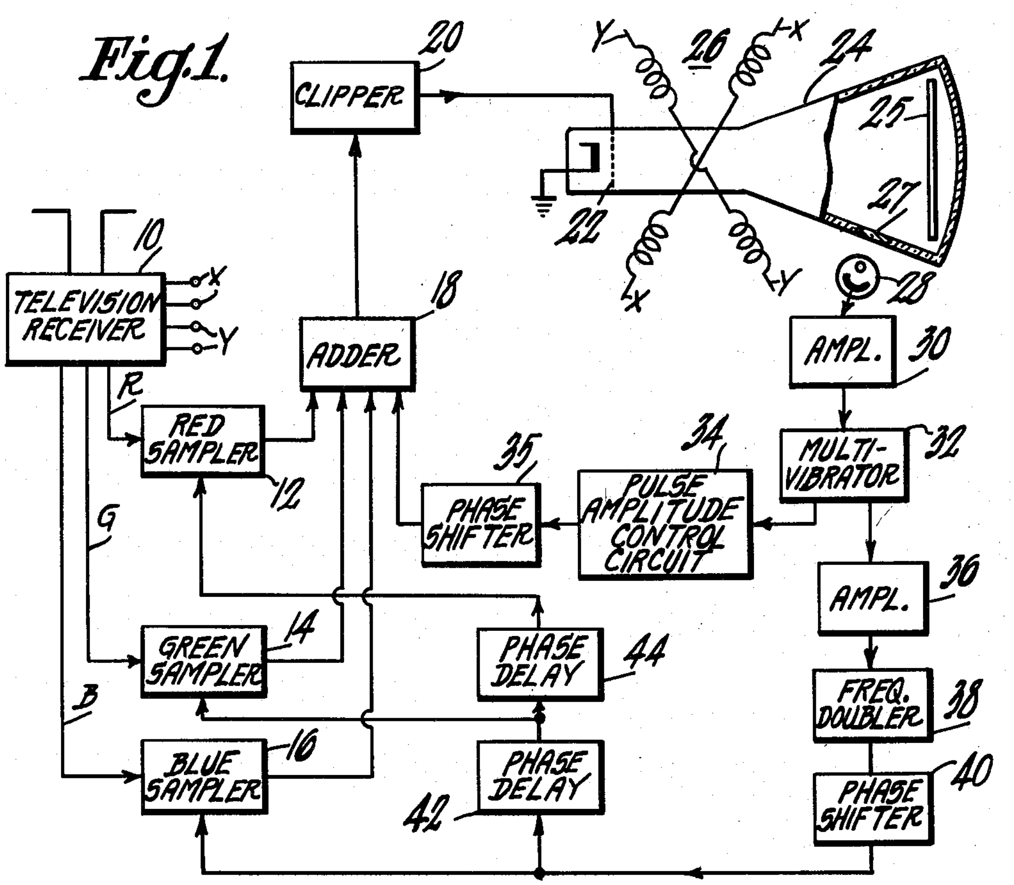
Figure 1 shows a block diagram of a system of the invention.

Referring now more specifically to Figure 1 there is shown a television receiver 10 for deriving three separate color signals R, G, and B from a received video signal. The three color signals R, G, and B so derived, are each representative of a component color in a reproduced image. A television receiver for accomplishing this result is shown and described in a series of articles entitled "Fundamentals of color television" by Milton S. Kiver which appeared in Radio Television News magazine, beginning March 1954.

The three separate color signals R, G, and B from the color television receiver 10 are applied respectively to a red sampler 12, a green sampler 14 and a blue sampler 16 wherein the sequential application of the color signals R, G, and B to an adder circuit 18 is controlled. The output from the adder circuit 18 is coupled to a clipper circuit 20 and thence to a control grid 22 of an image reproducing tube 24.

The television receiver 10 also has provision for the generation of deflection voltages which will appear at terminals XX and YY of the television receiver 10 and are to be coupled to terminals XX and YY of a deflection yoke 26 associated with the image reproducing tube 24. The deflection signals applied to the deflection yoke 26 cause an electron beam formed within the image reproducing tube 24 to scan a raster pattern such that a picture may be formed.

The image reproducing tube 24 is provided with a target electrode 25 having certain signal generating elements positioned in discrete areas thereon. The structure of the target electrode will be later described; however, it is such that when scanned by an electron beam, ultra-violet light energy from signal generating elements on the target electrode will be radiated. The ultra-violet light energy from the target electrode 25 will be sensed by a photoelectric cell 28 through an ultra-violet light passing filter 27. The photoelectric cell 28 is connected to an amplifier circuit 30 wherein the target generated signals sensed by the photoelectric cell 28 may be amplified. The amplified target signals from the amplifier circuit 30 are utilized to trigger a multivibrator circuit 32. The multivibrator circuit 32 has a first pulse output coupled to a pulse amplitude control circuit 34, and a second pulse output coupled to an amplifier 36.

Upon receiving a target generated signal above a predetermined magnitude, the multivibrator circuit 32 will be triggered and delivers pulses to both the pulse amplitude control circuit 34, and the amplifier circuit 36. The pulse amplitude control circuit 34 which acts to amplify the pulses to a predetermined range of amplitude is connected through a phase shifter 35 to the adder circuit 18. The amplifier circuit 36 is coupled to a frequency doubler circuit 38 and thence to a phase shifter circuit 40 to result in a signal having a frequency twice that of the multivibrator 32 and which has been shifted in phase a predetermined amount from the signal of the multivibrator circuit 32. The phase shifter 40 is coupled to control the blue sampler circuit 16 directly; the green sampler circuit 14 through a phase delay circuit 42; and the red sampler circuit 12 through both the phase delay circuit 42 and a phase delay circuit 44.

Figure 2:
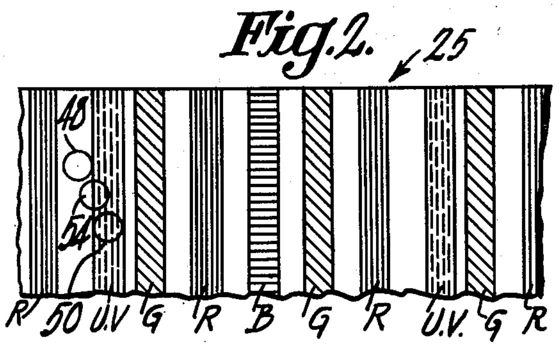
Figure 2 shows a representative portion of the target electrode which may be used in the system of Figure 1.

Before discussing the operation of the system of Figure 1 a consideration of the target electrode 25 in the image reproducing tube 24 will be desirable. There is shown in Figure 2 a diagrammatic representation of the structure of a portion of the target electrode to be used in the image reproducing tube 24. The target electrode of Figure 2 has repeating series of vertically oriented color light producing strip-like elements red, blue and green, however, each alternate series has substituted for the blue light producing elements in the pattern, an ultra-violet light emitting signal generating element U. V. Blank non-energy radiating areas are provided to separate each of the elements from the other and to provide a guard space between the elements blue, red, green and U. V. to improve color purity.

Other target element arrangements are practical for the operation of the system of this invention; however, in the present arrangement alternate blue light producing elements are sacrificed to provide space for the U. V. control element phosphor because the eye has less acuity for blue than for other colors.

Figure 3:
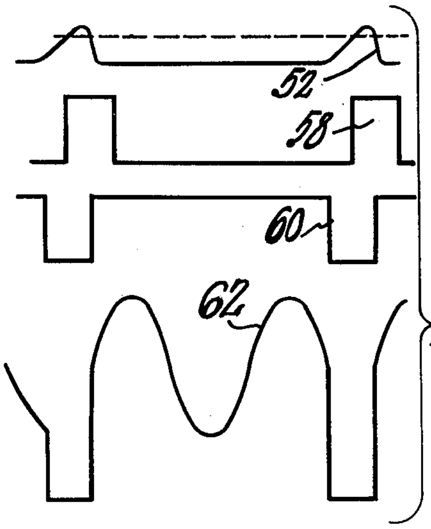
Figure 3 shows various waveforms of signals generated within the system of Figure 1.

Consider now the operation of the system of Figure 1 with reference to the waveforms as shown in Figure 3, wherein signal amplitude is plotted as ordinates and time as abscissa. Providing electron beam deflection is assumed to be uniform with time, the time plot of the curves of Figure 3 will coincide with the electron beam position on the target electrode as the beam scans horizontally across the target electrode.

The color signals R, G, and B from the color television receiver 10 are sequentially sampled i. e., gated by the sampler circuits 12, 14 and 16, and added to form a composite signal which is periodically representative of the different color signals R, G and B. The composite signal may be either a series of sharp pulses each of which represents one of the color signals R, G, or B or may be a sinusoidal varying signal representative of a particular of the color signals R, G, or B at different intervals. The composition of such a sinusoidal type signal is shown and described in an article entitled, "A six-megacycle compatible high-definition color television system" which appeared in RCA Review, page 504, December 1949.

The composite signal from the adder circuit 18 is then applied to the cathode 22 through the clipper circuit 20. The application of the composite signal to the control grid 22 is such as to intensity modulate the electron beam within the image reproducing tube 24 with the composite signal. The composite signal thus intensity modulates the electron beam within the image reproducing tube 24 such that the beam is sequentially, during different modulation intervals, representative of the different color signals. During each intensity modulation interval, when the beam is intensity modulated by a different color signal, it will be desirable to have the electron beam impinge only upon one particular of the color light producing elements, such that the color produced will coincide with the color signal which modulates the electron beam at a particular instant. In order to preserve this relationship correctly either the periods of modulation may be varied by altering the sampling intervals of the samplers 12, 14 and 16 or, the deflection i. e., position of the electron beam on the target electrode may be altered. In the system of Figure 1 control is maintained by varying the intervals of modulation by utilizing the target signals generated to control the samplers 12, 14 and 16.

Consider now the generation of the target generated signal. As the electron beam, during its horizontal scan, is moved onto an area adjacent to one of the ultra-violet light emitting elements U. V. to a position as shown by a spot 48 the beam is raised to a constant high intensity. Further movement of the beam toward a position shown by a spot 50 will cause a signal to be generated as is shown in a curve 52 of Figure 3. The target generated signal shown by curve 52 in the form of light energy will be filtered by the filter 27 and sensed by the photoelectric cell 28. The target generated signal received by the photoelectric cell 28 and amplified by the amplifier circuit 30 will have a waveform substantially as shown by the curve 52. The steepest portion of the curve occurs approximately when the electron beam is in a position indicated by a spot 54. The spots 48, 54 and 50 are displaced vertically in the drawing in order to show more clearly their position with respect to the edge of the U. V. light-emitting strip. Actually, however, it will be understood that the spots are aligned horizontally as determined by the horizontal line scan. The somewhat cylindrical shape of the electron beam will account for the rate of increase in signal amplitude of the signal of the curve 52 being non-uniform. The target signal shown by the curve 52 is coupled to the multivibrator circuit 32 which is so biased as to reverse its state and generate a steep leading edge pulse upon being triggered by a signal of an amplitude above the level shown by a dashed line 56. It is desirable that the multivibrator circuit 32 be so biased as to be triggered when the electron beam position is substantially as shown by the spot 54 because at the instant when the electron beam is half on the signal generating element U. V., and the rate of change of the target generated signal is greatest. The instant when the rate of change of the target generated signal is greatest will coincide to the time when the most critical control may be effected. When the target signal reaches a predetermined level the multivibrator circuit 32 will be triggered and pulses as shown in curve 58 with a steep leading edge will be generated. The pulses as shown by the curve 58 will be fed to the amplifier 36 which may contain sufficient inductance to round off the edges of the pulses. Pulses from the amplifier 36 are then doubled in frequency by the frequency doubler circuit 38 and phase shifted by the phase shifter 40 to result in a sampler control signal which is used to control the sampler circuits 12, 14 and 16. Upon sequentially receiving a sampler control signal above a predetermined magnitude the sampler circuits 12, 14 and 16 will sequentially allow the passage of the color signals R, G, and B. The sampler control signal is taken directly from the phase shifter 40 to control the blue sampler 16. The sampler control signal is phase delayed approximately 120° in the phase delay circuit 42 then applied to control the green sampler 14. The sampler control signal is delayed by still another 120°, effected by the delay circuit 44, and is then utilized to control the red sampler 12. It may therefore be seen that the signals applied to the samplers 12, 14 and 16 will be substantially 120° apart and will cause each of the sampler circuits 12, 14 and 16 to sequentially pass a different color signal.

The pulses as shown by the curve 58 are also fed to the pulse amplitude control circuit 34 wherein pulse amplitude may be altered and phase shift effected to form a curve as shown in curve 60. The pulses of curve 60 are applied to the adder 18 with the color signals which sequentially appear from the samplers 12, 14 and 16. The color signals R, G, and B and the pulse as shown in curve 60 are then added to form the composite signal as shown in curve 62. Curve 62 represents in sinusoidal waveform, a sequential appearance of the different color signals R, G, and B plus the addition of the negative going square pulses as shown in the curve 62. The square pulses are superimposed over a portion of the sinusoidal waveform which contains a blue color signal B in such a manner as to alternately substitute a pulse for the blue signal B. The pulse is for the purpose of driving the control grid 22 to a more negative point during the period when the signal generating ultra violet light emitting elements U. V. are excited, thereby causing the beam to be of high intensity. The level to which the curve 62 is driven by the addition of the pulses is governed by the level set by the clipper circuit 20.

It may therefore be seen that the leading edges of the pulses of curve 58 will be indicative of the instant when the electron beam is in a position as shown by the spot 54. The position as shown by spot 54 coinciding to the instant when sufficient electrons in the electron beam are impinging upon the ultra violet element U. V. to cause the target generated signal to be of such magnitude as to trigger the multivibrator circuit 32. The leading edges of the pulses of the curve 58 may therefore be utilized to control the relationship between the modulation intervals and the excitation intervals to maintain the proper color reproduction in a reproduced picture.

It may be seen that each individual pulse in the curve 58 contains beam position information which may be utilized in various manners to control the electron beam in various forms of the invention. Systems to control the electron beam in different ways, which utilize the rapidly available information contained in each of the individual pulses may therefore be very fast acting.

Having thus described the invention, what is claimed is:

1. A cathode ray beam control system comprising a target electrode having a plurality of signal generating elements positioned thereon, said signal generating elements being responsive to generate a target generated signal when excited by electron beam energy during certain intervals of excitation, means for forming an electron scanning beam for exciting said signal generating elements, means for sensing said target generated signal, pulse generating means for generating pulses from said target generated signal, said pulses having a characteristic which coincides in time with a predetermined position of said electron beam, means for controlling the level of intensity of said electron beam, and means for applying said pulses to said means for controlling said electron beam for maintaining said beam at a constant predetermined level during said certain intervals of excitation.

2. A device according to claim 1 wherein said signal generating elements comprise an ultra violet light emitting phosphor material.

3. A device according to claim 1 wherein said pulse generating means comprises a multivibrator circuit, said multivibrator circuit being operative to generate electrical pulses having a steep leading edge upon receiving an electrical signal having an amplitude above a predetermined amplitude.

4. A cathode ray beam control system comprising a target electrode having a plurality of signal generating elements positioned thereon, said signal generating elements being responsive to generate a target generated signal when excited by electron beam energy during certain intervals of excitation, means for forming an electron scanning beam for exciting said elements, means for sensing said target generated signal, pulse generating means for generating pulses in response to said target generated signal, said pulses having a leading edge which coincides in time with a predetermined position of said electron beam with respect to said elements, means for controlling the intensity of said electron beam, and means for amplifying said pulses to a predetermined level and for applying said amplified pulses to said means for controlling said electron beam for maintaining said electron beam at a predetermined fixed intensity during the intervals when said beam impinges on said elements.

5. A color television image reproducing system comprising a target electrode having a plurality of light producing elements and a plurality of signal generating elements positioned thereon, said light producing elements being responsive to emit light energy when excited by electron beam energy during certain intervals of excitation, said signal generating elements being responsive to generate a target generated signal when excited by electron beam energy during other intervals of excitation, means for forming an electron scanning beam for exciting said elements, modulation means for intensity modulating said electron beam with color signals during said certain intervals of modulation and with a substantially unvarying signal during said other intervals of modulation, means for sensing said target generated signal, pulse generating means for generating pulses in response to said target generated signal, said pulses having leading edges coinciding in time with a predetermined position of said electron beam, timing means for varying the relationship between said intervals of excitation and said intervals of modulation, and means for applying said pulses to said timing means such that the relationship between said intervals of excitation and said intervals of modulation are controlled by said leading edges of said pulses.

6. A color television system comprising a target electrode having interlaid light producing elements and signal generating elements positioned thereon, means for generating an electron beam for exciting said light producing elements and said signal generating elements, means for deflecting said electron beam over said target electrode, modulation means for intensity modulating said electron beam, means for sequentially applying different signals to said modulating means during certain modulating intervals, sensing means for detecting signals from said signal generating elements to form a target generated signal, pulse generating means for generating constant amplitude pulses in response to said target generated signal, said pulses having leading edges having predetermined time position relationship with respect to predetermined deflection positions of said electron beam, control means for varying said modulating intervals with respect to different deflection positions of said electron beam, means for applying said pulses to said control means such that said leading edges of said pulses controls the relationship between modulating intervals and said different deflection positions of said electron beam and means for applying said constant amplitude pulses to said modulating means for periodically maintaining said beam at a substantially constant intensity.

7. A color television system comprising a target electrode having interlaid color light producing elements and signal generating elements positioned thereon, means for generating an electron beam for exciting said light producing elements and said signal generating elements, means for deflecting said electron beam over said target electrode, modulation means for intensity modulating said electron beam, a plurality of sampling circuits for sequentially applying different color signals to said modulating means during certain modulating intervals, sensing means for detecting signals from said signal generating elements to form a target generated signal, multivibrator means for generating pulses having a substantially fixed predetermined amplitude in response to said target generated signal, said pulses having leading edges having predetermined time position relationships with predetermined deflection positions of said electron beam, control means for varying said modulating intervals with respect to the deflection position of said electron beam, means for applying said pulses to said control means such that said leading edges of said pulses controls the relationship between said modulating intervals and said deflection position of said electron beam and means for applying said constant amplitude pulses to said modulating means for maintaining said beam at a substantially constant intensity during the period of said pulses.

8. A color television system comprising a target electrode having interlaid color light producing elements and signal generating elements positioned thereon, means for generating an electron beam for exciting said light producing elements and said signal generating elements, means for deflecting said electron beam over said target electrode, modulation means for intensity modulating said electron beam, a plurality of sampling circuits adapted to receive a plurality of different color signals, said sampling circuits for sequentially applying different color signals to said modulating means during certain modulating intervals, sensing means for detecting signals from said signal generating elements to form a target generated signal, multivibrator means for generating pulses in response to said target generated signal, said pulses having leading edges having predetermined time position relationship with predetermined deflection positions of said electron beam, means for forming a plurality of sampling signals from said pulses and means for applying said sampling signals to said sampling circuits for controlling said modulating intervals with respect to the deflection position of said electron beam and means for applying said pulses to said modulating means to provide a substantially constant beam current during the period of said pulses.

9. A color television system comprising a target electrode having interlaid color light producing and signal generating elements positioned thereon, means for generating an electron beam for exciting said light producing elements and said signal generating elements, means for deflecting said electron beam over said target electrode, modulation means for intensity modulating said electron beam, a plurality of sampling circuit adapted to receive a plurality of different color signals, said sampling circuits for sequentially applying different color signals to said modulating means during certain modulating intervals, sensing means for detecting signals from said signals generating elements to form a target generated signal, pulse generating means for providing from in response to said target generated signal, said pulses having leading edges having predetermined time position relationships with predetermined deflection positions of said electron beam, means for forming a plurality of sampling signals from said pulses, and means for applying said sampling signals to said sampling circuits for controlling said modulating intervals with respect to the deflection position of said electron beam, delay means for delaying said pulses by a predetermined time interval to form delayed pulses, means for applying said delayed pulses to said modulating means, such as to cause said modulating means to receive a substantially unvarying signal during other modulating intervals.

References Cited in the file of this patent

UNITED STATES PATENTS

| | | |
|---|---|---|
| 2,648,722 | Bradley | Aug. 11, 1953 |
| 2,667,534 | Creamer et al. | Jan. 26, 1954 |
| 2,674,651 | Creamer | Apr. 6, 1954 |